United States Patent [19]

Lennen

[11] Patent Number: 5,537,121

[45] Date of Patent: Jul. 16, 1996

[54] CARRIER PHASE MULTIPATH REDUCTION TECHNIQUE

[75] Inventor: Gary R. Lennen, San Jose, Calif.

[73] Assignee: Trimble Navigation Limited, Sunnyvale, Calif.

[21] Appl. No.: 431,010

[22] Filed: Apr. 28, 1995

[51] Int. Cl.[6] .............................. H04B 7/185; G01S 5/02
[52] U.S. Cl. ............................................................ 342/357
[58] Field of Search .......................... 342/357; 455/12.1; 375/343

[56] References Cited

U.S. PATENT DOCUMENTS

| | | | |
|---|---|---|---|
| 5,268,695 | 12/1993 | Dentinger et al. | 342/357 |
| 5,293,170 | 3/1994 | Lorenz et al. | 342/357 |
| 5,390,207 | 2/1995 | Fenton et al. | 342/357 |
| 5,414,729 | 5/1995 | Fenton | 342/357 |

*Primary Examiner*—Theodore M. Blum
*Attorney, Agent, or Firm*—Law Offices of Thomas E. Schatzel

[57] ABSTRACT

An improved navigation satellite receiver with a digital channel processor including a triple carrier mixer with an early carrier mixer, a punctual carrier mixer and a late carrier mixer all connected to receive I and Q sample outputs from an IF downconverter. A triple carrier numeric controlled oscillator (NCO) includes an early carrier NCO, a punctual carrier NCO and a late carrier NCO for synthesizing three independent local carrier frequency outputs that are separated in phase from one another. A triple code mixer connects to the triple carrier mixer and comprises an inphase early-carrier early-code mixer, an inphase punctual-carrier punctual-code mixer, an inphase late-carrier late-code mixer, a quadrature early-carrier early-code mixer, a quadrature punctual-carrier punctual-code mixer, and a quadrature late-carrier late-code mixer with corresponding outputs for each mixer. A set of six correlators connected to the triple code mixer provide information to the microcomputer for the control of the triple carrier NCO in three independent carrier tracking loops that use three corresponding time-delayed points on the overall autocorrelation function and form a corrected carrier phase measurement substantially independent of multipath interference.

10 Claims, 6 Drawing Sheets

CARRIER PHASE MULTIPATH REDUCTION TECHNIQUE

BACKGROUND OF THE INVENTION

1. Field of the Invention

The invention relates generally to radio communication and more specifically to navigation receivers that operate with signals received from orbiting navigation satellites and equipment and methods for reducing multipath signal interference.

2. Description of the Prior Art

The global positioning system (GPS) supported by the United States government enables satellite navigation for military and civilian users alike. Two codes, a coarse-grained acquisition code (C/A-code) and a fine-grained precision code (P-code) are transmitted on two L-band microwave frequencies, e.g., L1 on 1575.42 MHz and L2 on 1227.6 MHz, and each provide ranging and GPS-system time information. The C/A-code is available to civilian users and the P-code is available only to authorized users. During certain periods, the P-code is encrypted and such encrypted P-code is referred to as Y-code. The C/A-code is a digital sequence that repeats each millisecond and is unique to one of two dozen satellites. The P-code is a digital sequence that has a period of 269 days, with one week long segments of it transmitted intact. A single week-long segment is $10.23 \times 10^6 \times 604800$ bits long, which comes from the P-code transmission rate of 10.23 MHz times the exact number of seconds in seven whole days. So a code phase uncertainty of even plus-or-minus one second can call for a search through 20,460,000 chips.

Although each orbiting GPS satellite may transmit a single carrier for each frequency and only one receiver antenna is needed to receive that carrier signal, the direct signal and many other signals that took longer paths to the receiver due to reflections can be simultaneously received. The phases of the received multipath signals can combine to add or subtract from the direct path carrier signal and cause phase distortions. Because the multipath signals take a longer path, they always arrive at the receiver later than the direct path carrier signal. Conventional GPS receivers resolve their positions to accuracies of plus-or-minus two centimeters by measuring the carrier phase of either or both of the L1 and L2 carriers which have respective wavelengths of nineteen centimeters and twenty-four centimeters.

The carrier signal is spread spectrum modulated with a psuedorandom code sequence and conventional GPS receivers lock on to both the carrier phase and the code phase. The spread spectrum modulated carrier signal is despread by correlating the downconverted signal with a local code. An autocorrelation maximum will occur when the local code phase exactly matches the received code phase. Proper carrier phase locking depends on proper code phase locking. The code comprises 1023 chips and as the local code phase is slipped plus-or-minus one-half chip, the output power of the correlator will rise from zero through maximum at the exact local code phase match and back to zero, e.g., in a triangular waveform. Early, punctual and late versions of the local code phase are used to characterize the carrier phase lock. The presence of multipath carrier signals will distort the late side of the autocorrelation waveform and thereby cause the receiver to lock on to a local code phase that is later than the ideal phase. In such a case, the carrier phase lock will also be in error. Because multipath carrier signal energies are so erratic, the point of local code phase lock can similarly be erratic.

The GPS carrier phase measurement is subject to multipath errors generated from one or more reflected signals entering the antenna. There would be no carrier phase multipath if the antenna connected to the receiver was so directional it could only receive the direct signal from each satellite, assuming no secondary reflected signals from the satellites themselves. In practice, the receiver antenna is omnidirectional subject to one or more reflected signals as well as the desired direct signal. The magnitude and phase of the reflected signals with respect to the direct signal is dependent on the environment the antenna is operating in and thus is subject to considerable change, especially in applications where the antenna is moving, e.g., in navigation, differential and real-time kinematic modes.

The period and magnitude of the multipath is dependent on the electrically-reflective environment the antenna is situated in. The carrier phase multipath error is cyclical in nature and can be reduced by measurement averaging. But averaging requires ten to fifteen minutes of holding stationary to average the collected measurements to significantly subtract out the carrier phase multipath induced errors. In many applications, the antenna cannot be held still and it is therefore subject to significant variations in the multipath signature and a random loss of satellite lock. So in practical terms, averaging is not a solution for significantly reducing carrier phase multipath. Other conventional attempts to mitigate multipath have included altering the antenna gain pattern such that signal reflections from low elevation, ground level, objects are reduced. These techniques usually require physically large, non-portable antenna designs, e.g., choke ring antenna. Even so, high-elevation multipath sources would not be screened out and could still cause distortion.

The carrier tracking loop in conventional GPS receivers conventionally control the phase difference between incoming and locally generated carriers to approach zero, thus driving the signal magnitude observed in the conventional quadrature correlators to zero. When the carrier tracking loop is closed for the ideal non-multipath case the direct signal vector ($S_D$) is inphase (0°) with the observed signal ($S_O$). Although it is the observed signal that the carrier tracking loop locks to, the lock will have zero phase error to the direct signal, thus no problem arises. But in the presence of a multipath signal ($S_M$), the direct signal and the multipath signal ($S_M$) vectors will combine to form the vector product which is accepted by the receiver as the observed signal. In this case, the vector of the multipath signal induces a false measurement of both the amplitude and phase of the direct signal, and the carrier tracking loop will produce an inphase signal (I) that is not zero degrees apart from the actual direct signal. The ninety-degree (90°) quadrature signal (Q) will similarly be affected. Such phase errors will be interpreted by the receiver as placing the ultimate position estimate of the receiver away from its true location. The magnitude and direction of the displacement depends on the signal strength and path delays of the multipath signals.

SUMMARY OF THE PRESENT INVENTION

It is therefore an object of the present invention to provide a navigation receiver that is largely unaffected by multipath signal interference.

It is a further object of the present invention to provide a navigation receiver that can lock its carrier tracking loop to the direct signal of a GPS satellite in the presence of multipath signal interference.

It is another object of the present invention to provide a method for allowing a navigation receiver to be relatively unaffected by multipath signal distortions.

Briefly, an embodiment of the present invention comprises an improved navigation satellite receiver with a digital channel processor including a triple carrier mixer with an early carrier mixer, a punctual carrier mixer and a late carrier mixer all connected to receive I and Q sample outputs from an IF downconverter. A triple carrier numeric controlled oscillator (NCO) includes an early carrier NCO, a punctual carrier NCO and a late carrier NCO for synthesizing three independent local carrier frequency outputs that are separated in phase from one another. A triple code mixer connects to the triple carrier mixer and comprises an inphase early-carrier early-code mixer, an inphase punctual-carrier punctual-code mixer, an inphase late-carrier late-code mixer, a quadrature early-carrier early-code mixer, a quadrature punctual-carrier punctual-code mixer, and a quadrature late-carrier late-code mixer with corresponding outputs for each mixer. A set of six correlators connected to the triple code mixer provide information to the microcomputer for the control of the triple carrier NCO in three independent carrier tracking loops that use three corresponding time-delayed points on the overall autocorrelation function and form a corrected carrier phase measurement substantially independent of multipath interference.

An advantage of the present invention is that a navigation receiver is provided that is relatively insensitive to multipath interference.

Another advantage of the present invention is that a navigation satellite receiver is provided that tracks the direct signal from a satellite and thus can provide better ranging measurements.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
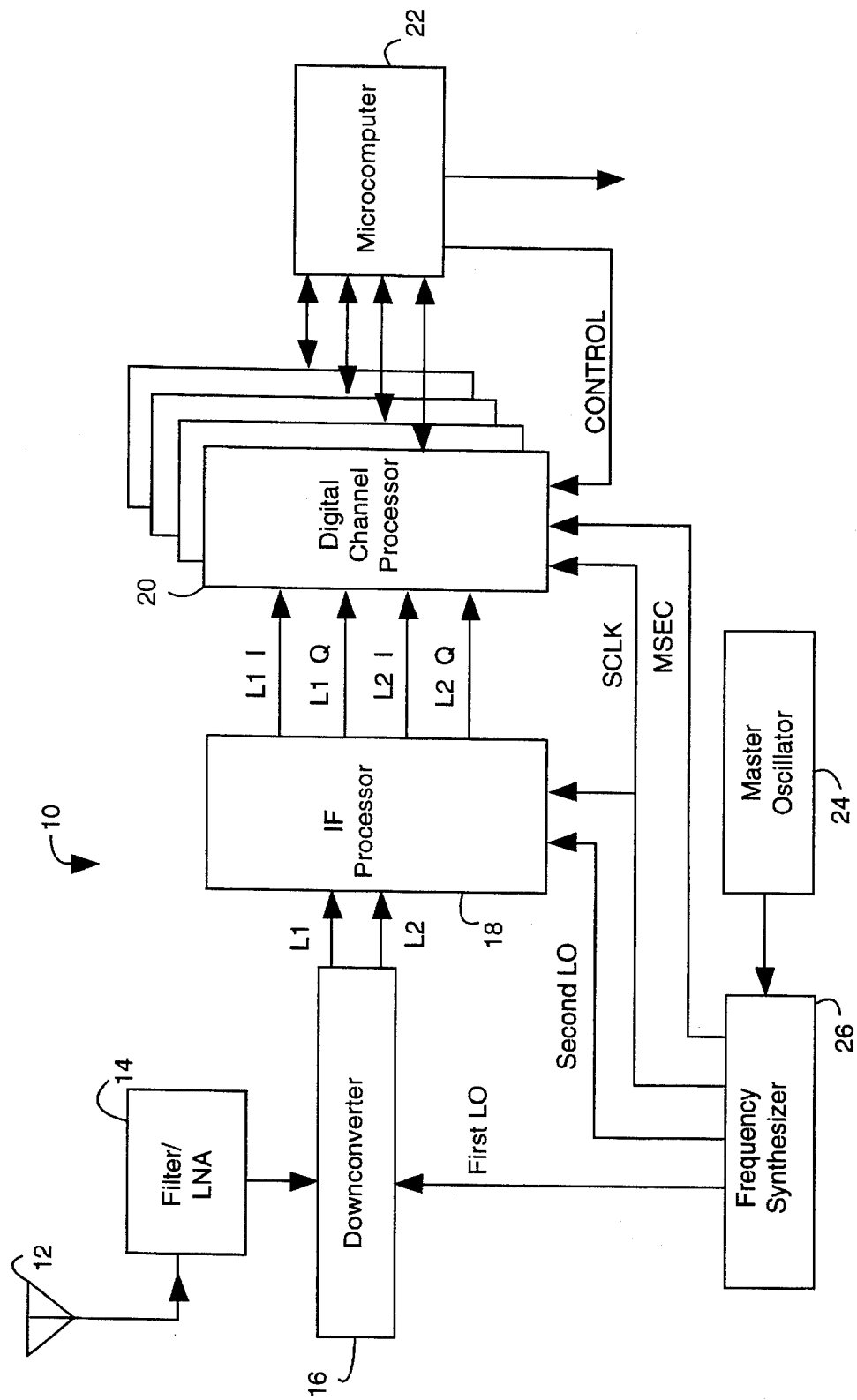
FIG. 1 is a block diagram of a navigation satellite receiver in a first embodiment of the present invention.

FIG. 1 illustrates a global positioning system (GPS) navigation satellite receiver embodiment of the present invention, referred to by the general reference numeral 10. Orbiting GPS satellites transmit L-band microwave GPS signals "L1" and "L2" which are received by a dual-frequency microstrip antenna 12 and are then filtered and amplified by a low noise amplifier (LNA) 14. The satellite signal is then frequency translated to lower, intermediate frequency by a downconverter 16. The output of the downconverter 16 is further frequency translated by the IF processor 18 before being digitized, with inphase (I) and quadrature (Q) components of both L1 and L2 signals. The resulting digitized output of the IF processor 18 is fed to a multiplicity of digital channel processors 20, where each digital channel processor 20 is designed to track the code and carrier signals on L1 and L2 of a particular satellite. A number "N" of digital channel processors 20 are present, which leads to a capability of tracking "N" satellites using both L1 and L2 signals. A microcomputer 22 participates in closing the code and carrier tracking loops and in performing code and carrier phase measurements, as well as other functions.

In the filter-LNA 14, the combined L1/L2 signal from the antenna 12 is power split, separately filtered in L1 and L2, power combined into a single L1/L2 signal again and then amplified. A master oscillator 24 includes a ten MHz crystal oscillator which is then divided by two to provide a five MHz signal to be used by the frequency synthesizer block. A frequency synthesizer 26 synthesizes both local oscillator and clock signals to be used elsewhere in the receiver. The frequency synthesizer 26 includes a feedback loop which phase locks the output of a voltage controlled oscillator (VCO) to the five MHz signal. Frequency dividers are used to provide different frequencies that are used elsewhere in the receiver. A first local oscillator (LO) signal of 1400 MHz is used by the downconverter 16 for frequency translation. A second LO is used by the IF processor 18 for frequency translation. A sampling clock (SCLK) is used for digitization and subsequent digital channel processing. A millisecond (MSEC) clock is used by the receiver in a measure of local time reference.

The downconverter 16 frequency translates the incoming L1 (1575.42 MHz) and L2 (1227.6 MHz) signals. The L1/L2 input signal is power split before the L1 and L2 signals are separately mixed with the first local oscillator signal. The resultant mixer outputs are bandpass filtered before further amplification. The downconverter 16 outputs the L1 and L2 signals at carrier center frequencies of 175.42 MHz and 172.40 MHz, respectively.

The IF processor 18 further frequency translates the L1 and L2 signals, and provides outputs that are the inphase (I) and quadrature (Q) digitized samples of the L1 and L2 signals. The L1 and L2 signals are power split before being mixed with I and Q versions of the second local oscillator. The resulting mixer outputs are low pass filtered and amplified before being one bit quantized and sampled. A flip-flop is used to sample the signals at the rate of SCLK. The L1 output has digitized I and Q versions of the L1 satellite signals at a carrier center frequency of 420 KHz. The L2 output provides digitized I and Q versions of the L2 satellite signals at a carrier center frequency of 2.6 MHz.

Each digital channel processor 20 includes an L1 tracker and an L2 tracker. The L1 tracker helps process the L1 signal, by using the I-L1 and Q-L1 input signals. The L2 tracker facilitates processing of the L2 signal, and uses the I-L2 and Q-L2 input signals.

Figure 2:
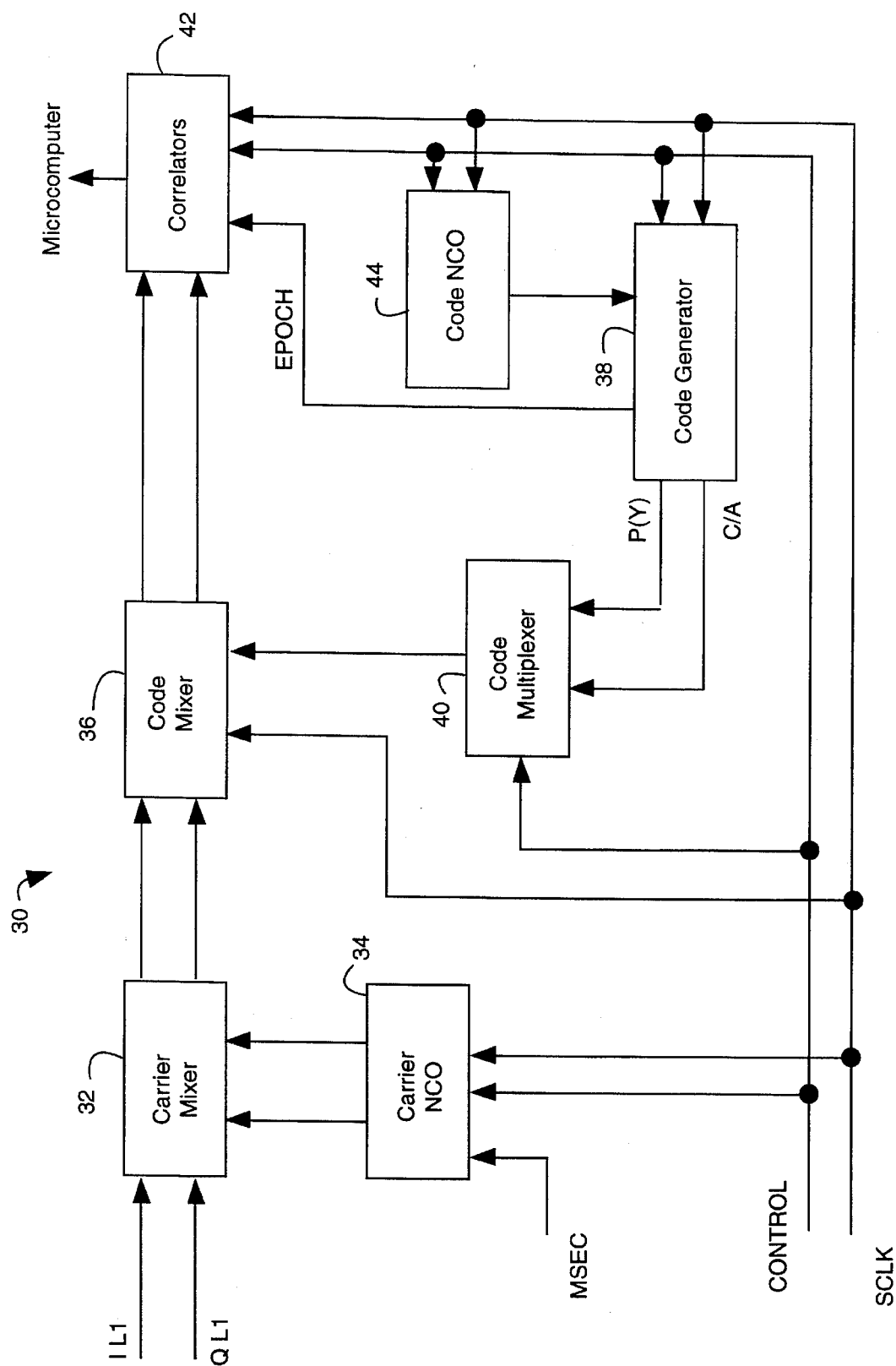
FIG. 2 is a block diagram of an L1 tracker included in the digital channel processor of the navigation satellite receiver of FIG. 1.

FIG. 2 illustrates an L1 tracker 30 that is conventional of the L1 and L2 trackers used in the digital channel processors 20. A triple carrier mixer 32 receives digital samples I-L1 and Q-L1 for frequency translation to zero frequency, e.g., from a 420 KHz intermediate frequency for L1. A carrier numerically controlled oscillator (NCO) provides inphase early, punctual and late signals ($I_{E\_nco}$, $I_{P\_nco}$, $I_{L\_nco}$) and quadrature early, punctual and late signals ($Q_{E\_nco}$, $Q_{P\_nco}$, $Q_{L\_nco}$). The output of the triple carrier mixer 32 includes early, punctual and late signals for each of the inphase and quadrature carrier sets ($I_{E\_carrier}$, $I_{P\_carrier}$, $I_{L\_carrier}$, $Q_{E\_carrier}$, $Q_{P\_carrier}$, $Q_{L\_carrier}$). These signals are processed by a code mixer 36 that combines the signals with a locally generated replica of the incoming spreading code supplied by a code generator 38 to produce early, punctual and late signals for each of the inphase and quadrature code and carrier sets ($I_{E\_carrier}$, $I_{E\_code}$, $I_{P\_carrier}$, $I_{P\_code}$, $I_{L\_carrier}$, $I_{L\_code}$, $Q_{E\_carrier}$, $Q_{E\_code}$, $Q_{P\_carrier}$, $Q_{P\_code}$, $Q_{L\_carrier}$, $Q_{L\_code}$). In prior art receivers, only the punctual carrier is provided for both the early, punctual and late inphase and quadrature code sets. Such difference is critical. The microcomputer 22 controls the code selection for correlation by a multiplexer 40, either coarse (C/A-code) or precision (P-code) codes are selected. The output of the code mixer 36 provides time-distributed representations of the autocorrelation function between the satellite and the locally generated spreading codes. A set of correlators 42 integrate these samples over a period controlled by the code epoch, as is supplied by the code generator 38. The resulting correlation values are read out by the microcomputer 22 (FIG. 1) at a rate of one kilohertz.

The microcomputer 22 uses the correlation values to provide estimates of the code and carrier phase error offsets. The code phase error estimate is filtered by the microcomputer 22 before a feedback correction term is applied to a code NCO 44 such that the locally-generated spreading code is kept substantially aligned with the incoming satellite spreading code. A carrier phase error estimate is filtered by the microcomputer 22 before a feedback correction term is applied to the triple carrier NCO 34 such that the locally-generated carrier signal output from the triple carrier NCO 34 is kept substantially aligned with the incoming satellite carrier phase. The code phase measurement, "pseudorange", is measured by using the microcomputer 22 to keep track of code phase shifts that have been applied to the code NC0 44. These keep the locally generated spreading code aligned with the incoming satellite spreading code. A carrier phase measurement can be made by reading the triple carrier NCO 34 output phase on a MSEC time epoch, or by using the microcomputer 22 to keep track of the triple carrier NCO 34 updates made in the carrier tracking loop and then referring this value to the MSEC epoch. The receiver 10 uses the later technique and reads the triple carrier NCO 34 on the MSEC epoch.

The basic purpose of the triple carrier NCO 34 is to digitally synthesize locally-generated inphase punctual NCO and quadrature punctual NCO carrier frequencies in order to frequency translate the incoming satellite I-L1 and Q-L1 signals to zero carrier center frequency. This frequency translation is actually performed by the triple carrier mixer 32. A latch can be used by the microcomputer 22 to control the frequency synthesized by the triple carrier NCO 34. To adjust the triple carrier NC0 34 output frequency, the microcomputer 22 supplies a new control value. An adder and a latch together are conventionally used to form an accumulator for summing the output of the accumulator on every SCLK edge. The accumulator is configured to overflow at the desired output frequency rate. The top bits of the accumulator output represent the inphase carrier NCO output. Another adder and a latch together are used to generate a quadrature carrier NCO output. An accumulator overflow represents 360°, so adding a binary "01" to the two most significant summation bits adds, in effect, 90° to the result. The carrier phase of the incoming satellite signal being carrier tracked is conventionally measured with a latch. When the receiver carrier tracking loop is locked, the triple carrier NCO 34 output is in phase alignment with the incoming satellite carrier signal. The carrier phase is measured by latching the triple carrier NCO 34 output at a known local reference time, e.g., each millisecond with MSEC. The value read by the microcomputer 22 is a raw carrier phase measurement. The output frequency of the triple carrier NCO 34 is the product of the digital input word and the sampling frequency (SCLK) divided by two raised to the nth power, where "n" is the number of accumulator bits.

Multiple bits are used in both the triple carrier NCO 34 outputs and the carrier phase measurement to effectively reduce the quantization noise, e.g. reading "m" bits of carrier phase measurement will give a measurement resolution of $360°/2^m$.

The triple carrier mixer 32 uses the triple carrier NCO 34 output to heterodyne the incoming digital samples that are at a carrier center frequency of 420 KHz plus Doppler, to a center frequency of zero. Such frequency translation is commonly known as a "complex mix", wherein complex number combinations of I and Q are involved. The operation of the triple carrier mixer 32 can be represented mathematically, e.g., $I(P_{carrier})=L1\ I\times I_{P\_nco}+L1\ Q\times Q_{P\_nco}$ and $Q(P_{carrier})=L1\ I\times Q_{P\_nco}-L1\ Q\times I_{P\_nco}$.

The code mixer 36 mixes the received satellite signals with a locally-generated spreading code, using a spread of three different time delay points, e.g., early (E), punctual (P) and late (L). Such time delay refers to a relative offset between local code and incoming satellite code. The input I and Q digital samples are multiplied by the time-delayed versions of the local code, E, P and L. The code mixer 36 provides six outputs for correlation: $I(E_{code}, E_{carrier})$, $I(P_{code}, P_{carrier})$, $I(L_{code}, L_{carrier})$, $Q(E_{code}, E_{carrier})$, $Q(P_{code}, P_{carrier})$, and $Q(L_{code}, L_{carrier})$.

Figure 3:
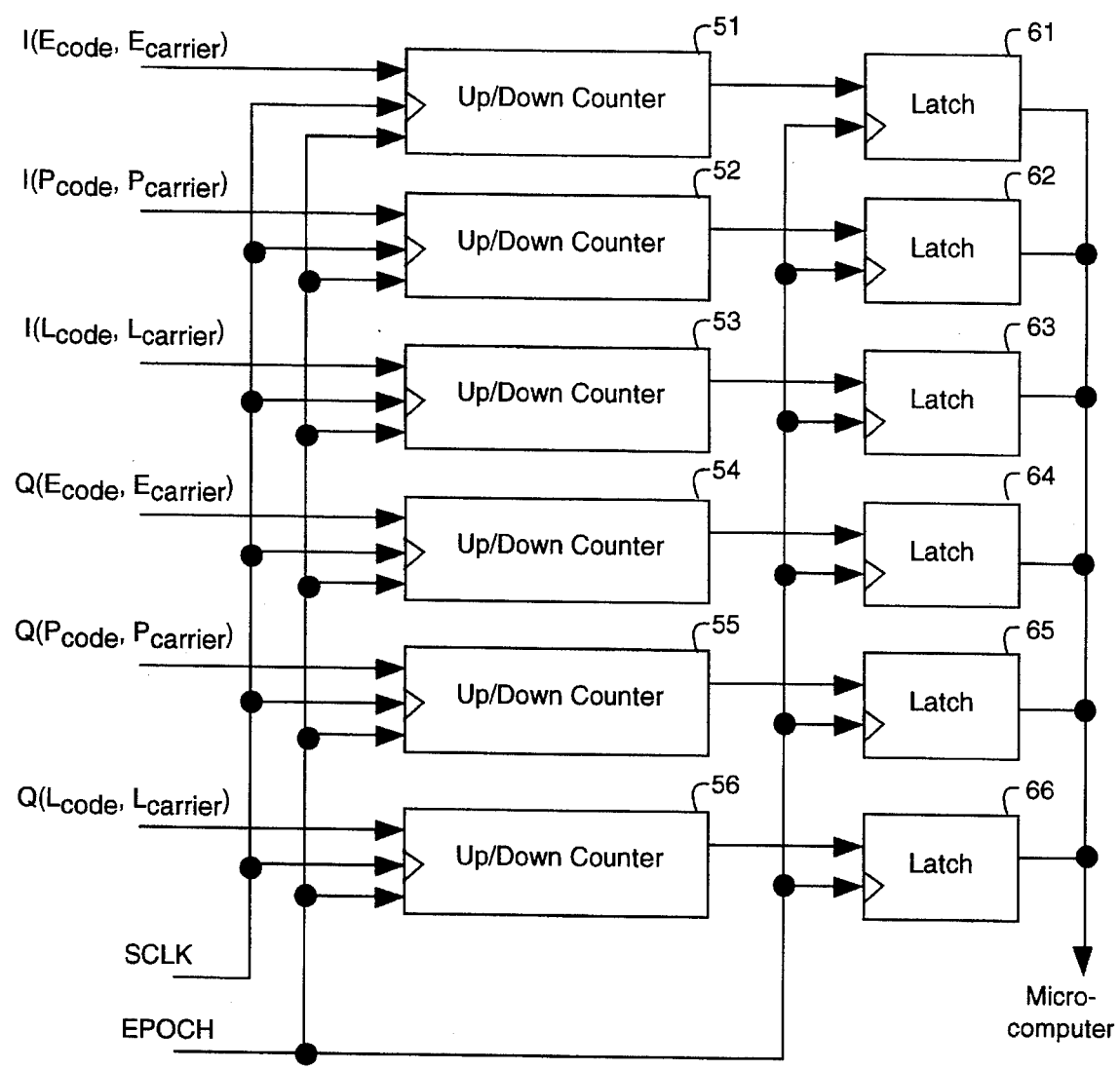
FIG. 3 is a block diagram of a correlator included in the L1 tracker of FIG. 2.

FIG. 3 shows one of the correlators 42 in greater detail. The six sets of correlation samples are integrated over a period of time given by an integer multiple of the epoch in the correlators 42. A set of six up/down counters 51–56 and latches 61–66 are configured to sum each of the correlated input samples and then latch the sums for input to the microcomputer 22. Each up/down counter 51–56 adds to the accumulation of the correlation if the sample is positive and subtracts from it if the sample is negative. The up/down counters 51–56 are reset every epoch to begin the integration process for the next epoch period. The latches 61–66 transfer the total at the occurrence of the EPOCH which also resets the counters 51–56 for the next accumulation period. The microcomputer 22 reads the outputs of correlators from the latches 61–66 at a rate of one KHz (e.g., each millisecond).

The code generator 38 provides locally-generated replicas of the appropriate satellite spreading code. The code generator 38 is clocked by the output of the code NCO 44 at a rate of 10.23 MHz. This clock is divided by ten to provide the coarse acquisition (C/A) code clock of 1.023 MHz. The microcomputer 22 controls the code generator 38 outputs which outputs an EPOCH signal that is a conventional GPS code generator timing signal.

The code NCO 44 provides a programmable clock source for the code generator 38 and typically includes a 12-bit adder and a 12-bit latch. On each sample clock (SCLK) edge, the output of the latch is added to the output of the multiplexer. The output of the multiplexer may assume one of three values, N, M or SHIFT. The code NCO 44 output frequency results from dividing the product of N by the sample clock with the result of adding N and subtracting M from two raised to the twelfth power. For example, if SCLK=twenty-five MHz, N=1023 and M=2619, then the code NCO output frequency is 10.23 MHz (the P-code rate).

The phase of the code NCO 44 output is adjusted by replacing the normal multiplexer outputs N or M by SHIFT, under control of the microcomputer 22. If this is done only once, the phase shift equals the result of dividing the result of subtracting SHIFT from M by the result of subtracting M and adding N to 4096, where the phase shift in the local code is adjusted in discrete steps of early and late by discrete sample clock periods.

The present invention forms two independent time-dispersed carrier-phase measurements. Prior art carrier tracking processes use information only at the punctual point in time on the autocorrelation function, e.g., punctual-I and punctual-Q. The information used in conventional systems is not time dispersive in nature and, because multipath is a time-dispersive phenomena, it cannot be used reliably to estimate the carrier phase multipath. Conventional carrier NCOs, carrier mixers and code mixers are improved in one embodiment of the present invention by the triple carrier NCO 34, the triple carrier mixer 32 and the code mixer 36.

Figure 4:
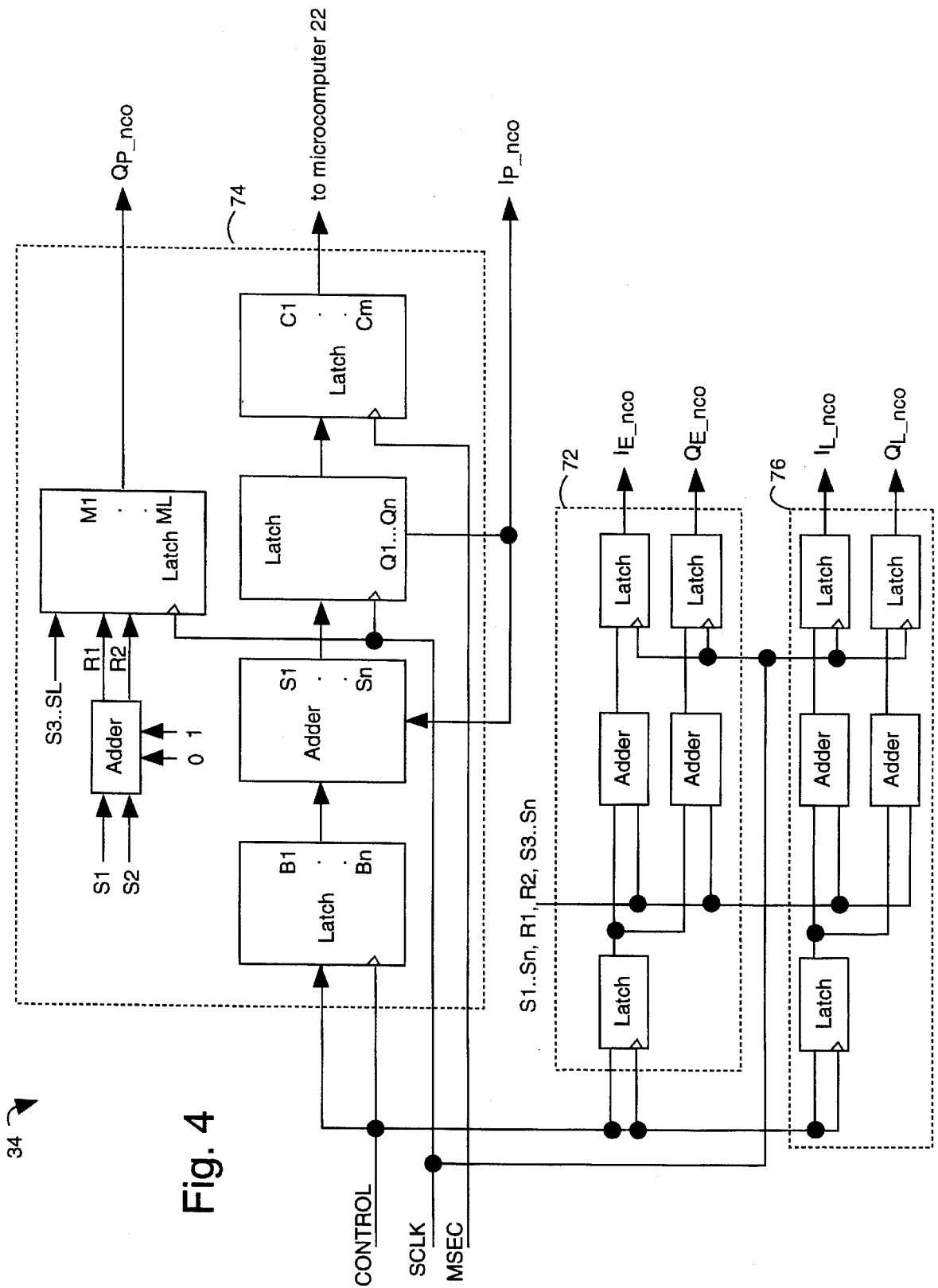
FIG. 4 is a block diagram of a triple carrier NCO included in the L1 tracker of FIG. 2.

FIG. 4 shows the triple carrier NCO 34 in greater detail and how it is capable of providing three independently-controlled carrier-phase outputs: $I_{E\text{-}nco}$ plus $Q_{E\text{-}nco}$, $I_{P\text{-}nco}$ plus $Q_{P\text{-}nco}$, and $I_{L\text{-}nco}$ plus $Q_{L\text{-}nco}$. The triple carrier NCO 34 comprises an early carrier NCO 72, a punctual carrier NCO 74, and a late carrier NCO 76. The microcomputer 22 is configured for independent control of each of the input frequencies $F_E$, $F_P$, and $F_L$, for each carrier NCO 72, 74 and 76.

Figure 5:
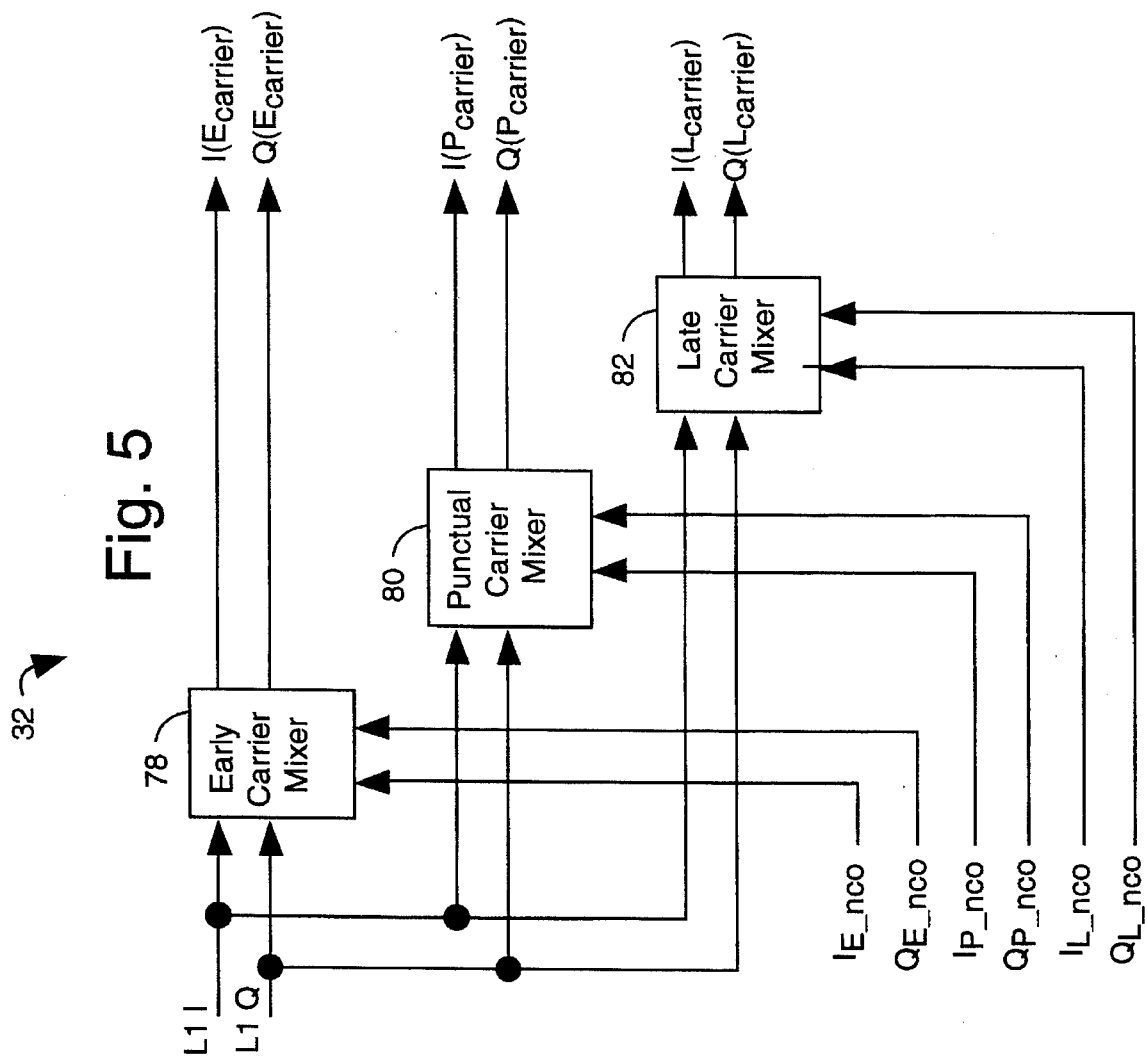
FIG. 5 is a block diagram of the triple carrier mixer included in the L1 tracker of FIG. 2.

The triple carrier mixer 32 is shown in FIG. 5 to comprise an early carrier mixer 78, a punctual carrier mixer 80 and a late carrier mixer 82. The triple carrier mixer 32 uses the independently-controlled outputs of the triple carrier NCO 34 to mix the incoming satellite signals to zero center frequencies in three separate mixes, e.g., to produce three independently-controlled relative phases.

A triple output of the triple carrier mixer 32 is connected to the three independent inputs of the triple code mixer 36. This code mixer multiplies each of the satellite signal input values by a time-delayed version of the locally-generated spreading code. The output samples of triple code mixer 36 represent samples of incoming satellite signal mixed with three different time delayed versions of local code and three different carrier NCO phases (in both I and Q).

Figure 6:
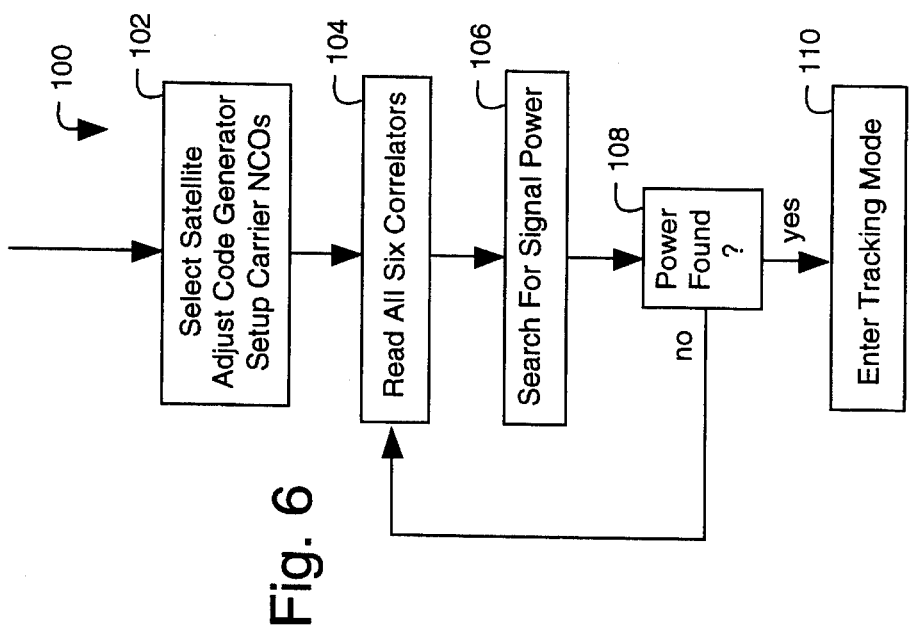
FIG. 6 is a flow chart of a computer-implemented process for acquisition that executes in the microcomputer shown in FIG. 1.

FIG. 6 illustrates a satellite signal acquisition process 100 that is implemented in computer software to run on the microcomputer 22. The process 100 comprises a step 102 for selecting a satellite to track, adjusting the code generator 38 and multiplexer 40 accordingly, and setting up the triple carrier NCO 34 with the expected frequency, given the selected satellite's estimated Doppler shift. A step 104 causes all six correlators 42 to be read. A step 106 searches for signal power using:

$$I(E_{code}, E_{carrier})^2 + Q(E_{code}, E_{carrier})^2 > \text{THRESHOLD};$$

$$I(P_{code}, P_{carrier})^2 + Q(P_{code}, P_{carrier})^2 > \text{THRESHOLD; and}$$

$$I(L_{code}, L_{carrier})^2 + Q(L_{code}, L_{carrier})^2 > \text{THRESHOLD, where}$$

THRESHOLD is an arbitrary power threshold that can be empirically adjusted. A step 108 returns control to the step 104 if no power was found, otherwise it allows entry to a tracking mode process 110.

Figure 7:
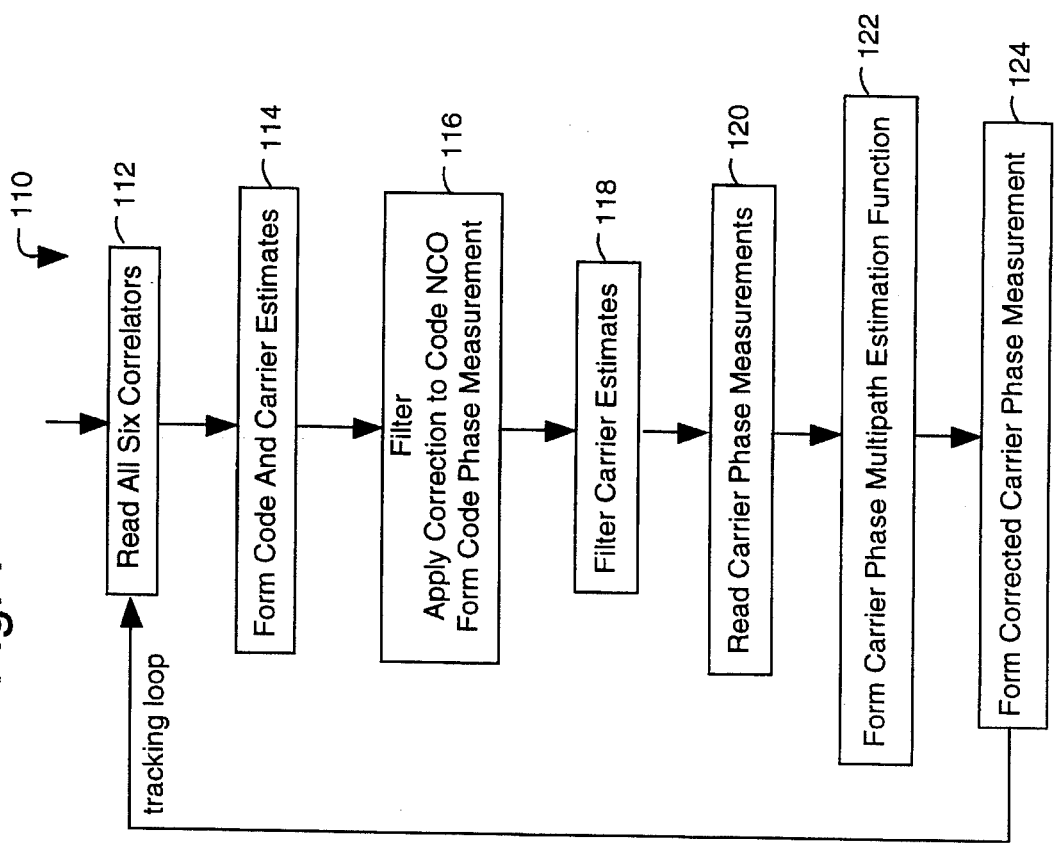
FIG. 7 is a flow chart of a computer-implemented process for tracking that executes in the microcomputer shown in FIG. 1.

FIG. 7 illustrates the tracking mode process 110, which comprises a step 112 that reads in all six correlators 42. A step 114 forms tracking loop code and carrier phase estimates from the correlator combinations read. The three carrier tracking phase estimates are symbolized as $\Delta_{carrier\_E}$, $\Delta_{carrier\_P}$, and $\Delta_{carrier\_L}$, for early, punctual and late carrier phases. In a step 116, a code estimate $\Delta_{code}$ is filtered and applied as a correction to the code NCO 44. In a step 118, the phase estimates are used in three independent carrier tracking loops with $\Delta_{carrier\_E}$ filtered and fed back by the microcomputer 22 to carrier NCO 72, $\Delta_{carrier\_P}$ filtered and fed back by the microcomputer 22 to carrier NCO 74, and $\Delta_{carrier\_L}$ filtered and fed back by the microcomputer 22 to carrier NCO 76. The object is to close three independent carrier tracking loops using three corresponding time-delayed points on the overall autocorrelation function. A step 120 reads the respective early, punctual and late carrier phase measurements, e.g., $C_E$, $C_P$, and $C_L$. A step 122 forms the carrier phase estimation function, $F_{est}(C_E, C_P, \text{and } C_L)$. A step 124 forms a corrected carrier phase measurement, $C_P\text{-}F_{est}(C_E, C_P, \text{and } C_L)$, which is relatively independent of the effects of multipath interference.

The independent carrier tracking loops formed at early, punctual and late time delay positions on the autocorrelation function are ordinarily subjected to significantly different multipath effects. Using this phenomenon to advantage, the three carrier tracking loops attempt to minimize the signal power output amplitude of their corresponding Q correlators: $Q(E_{code}, E_{carrier})$, $Q(P_{code}, P_{carrier})$, and $Q(L_{code}, L_{carrier})$. Whenever no multipath signal interference is present, all three carrier tracking loops produce carrier phase measurements that are equivalent in having zero relative mean measurement.

When multipath is present, a carrier phase measurement $C_{P\_multipath}$ is offset from the ideal by plus or minus a phase error $\epsilon$. A pair of carrier phase measurements $C_{E\_multipath}$ and $C_{L\_multipath}$ measurements at time-dispersed points on the autocorrelation function that are subject to different magnitudes of multipath interference. Thus the three carrier phase measurements are dependent of the magnitude of the multipath interference. But, $C_{E\_multipath}$ is the least sensitive to multipath interference, especially compared to $C_{L\_multipath}$. In between is $C_{P\_multipath}$. Importantly, it is possible to estimate the level of carrier phase multipath error by constructing a function that is dependent on the difference between two or more time dispersed carrier phase measurements, e.g.

$$\epsilon = F_{multipath\_est}(C_{E\_multipath}, C_{P\_multipath}), \text{ or}$$

$$\epsilon = F_{multipath\_est}(C_{L\_multipath}, C_{P\_multipath}), \text{ or}$$

$$\epsilon = F_{multipath\_est}(C_{E\_multipath}, C_{L\_multipath}), \text{ or}$$

$$\epsilon = F_{multipath\_est}(C_{E\_multipath}, C_{P\_multipath}, C_{L\_multipath}), \text{ or more generally,}$$

$$\epsilon = F_{multipath\_est}(C_{1\_multipath}, C_{2\_multipath}, \ldots, C_{K\_multipath}),$$

where there are K carrier phase measurements, K is an integer greater than one, taken at different time-delayed points on the autocorrelation function. The resultant multipath reduced carrier phase measurement is a reduced multipath carrier phase measurement equal to $C_{P\_multipath} - \epsilon$.

It is advantageous in alternative embodiments to recognize that the $C_{E\_multipath}$ carrier phase measurement is subject to the least amount of multipath. Such measurement can be effectively used alone as a reduced multipath measurement. The multipath signal component in $C_{E\_multipath}$ becomes smaller as the early correlator approaches the early limit of the autocorrelation function. Although it appears that the carrier phase measurement should be made as close to this edge as possible, the power available in each correlator for tracking at the early extreme is insufficient. Therefore, it is critical to allow carrier tracking loops to be closed in a two-step process. First, with the punctual time point on the autocorrelation function, which is a maximum power point. And second, closing the tracking loop at a time point close to the early extreme of the autocorrelation function, but back away toward the punctual to have enough signal power to maintain reliable tracking lock. Such a punctual carrier tracking loop, using phase estimate $\Delta_{carrier\_P}$, is used to track the signal because it is the largest power available and allows optimal tracking of receiver dynamics. The early carrier tracking loop, using phase estimate $\Delta_{carrier\_E}$, is aided in frequency by the punctual carrier tracking loop, allowing it to have a substantially lower bandwidth, e.g., 0.1 Hz versus ten Hz. Such frequency aiding of the early tracking loop by the punctual tracking loop overcomes the previously insurmountable problem in the prior art of the significantly lower power at the early edge of the autocorrelation function.

Specifically, such frequency aiding is implemented in practice by copying the NCO control value from the punctual carrier NCO 74 after closure of the punctual tracking loop to the early carrier NCO 72 before allowing the microcomputer 22 to maintain the closure of the early tracking loop. Such frequency aiding is possible because the early, punctual and late local carrier frequencies are by definition exactly the same, and should only differ in phase. The phase lock loop demands in such a case are tremendously reduced. The spread in phase from early through punctual to late phase does not exceed the phase spread of the signal power generated from the autocorrelation function. The appropriate local carrier frequency to use initially for the punctual carrier tracking loop is unknown because the master oscillator 24 contributes reference frequency uncertainties and the Doppler shift to the transmitted signal of each orbiting navigation satellite is very dynamic.

Alternative embodiments of the present invention generally include more than one carrier NCO, code NCO, carrier mixer and code mixer. FIGS. 1–8 are specifically directed to embodiments that represent the "triple" case, e.g., triple carrier NCO, triple code NCO, triple carrier mixer and triple code mixer. Other cases are also viable, e.g., the double and quadruple cases. The universal element in each case is that one carrier loop, the punctual, is used to frequency-aid the other carrier loops.

The frequency-aided carrier loops described herein can be used in a method of the present invention to make averaging carrier phase measurements. Typically, carrier phase measurements are averaged. A representative L1 carrier tracking loop has a bandwidth of greater than ten hertz to allow for receiver and satellite dynamics. For a ten second averaging time, all the carrier phase measurements are averaged for such a period. Where a primary carrier tracking loop with a ten hertz bandwidth is combined with a second frequency-aided carrier tracking loop with a bandwidth of one-tenth hertz, as in the present invention, a single carrier phase measurement can be used as the ten second averaged carrier phase. Such a secondary carrier tracking loop should be configured around the peak of the autocorrelation function.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved navigation satellite receiver with a radio frequency (RF) stage for filtering and amplifying L-band microwave radio transmissions subject to multipath interference from orbiting navigation satellites to an intermediate frequency (IF) downconverter with inphase (I) and quadrature (Q) sample outputs for each received L-band signal, the improvement comprising a digital channel processor including:

a triple carrier mixer with an early carrier mixer, a punctual carrier mixer and a late carrier mixer all connected to receive said I and Q sample outputs from said IF downconverter for producing corresponding heterodyne outputs from a triple local oscillator input;

a triple carrier numeric controlled oscillator (NCO) with an early carrier NCO, a punctual carrier NCO and a late carrier NCO for synthesizing three independent local carrier frequency outputs that are separated in phase from one another and respectively connected to said triple local oscillator input;

a triple code mixer connected to said outputs of the triple carrier mixer and comprising an inphase early-carrier early-code mixer, an inphase punctual-carrier punctual-code mixer, an inphase late-carrier late-code mixer, a quadrature early-carrier early-code mixer, a quadrature punctual-carrier punctual-code mixer, and a quadrature late-carrier late-code mixer with corresponding outputs for each said mixer; and a set of six correlators respectively connected to receive the individual outputs of said triple code mixer and each correlator comprising an up/down counter and latch connected to a microcomputer;

wherein the six correlators provide information to said microcomputer for the control of the triple carrier NCO in three independent carrier tracking loops that use three corresponding time-delayed points on the overall autocorrelation function and form a corrected carrier phase measurement substantially independent of multipath interference.

2. The improved receiver of claim 1, wherein:

the six correlators provide information to said microcomputer for closure first of said punctual tracking loop and frequency aiding said early tracking loop for closure from said punctual tracking loop.

3. The improved receiver of claim 1, further comprising satellite signal acquisition program means in said microcomputer for:

selecting a satellite to track, adjusting a code generator connected to the triple code mixer accordingly, and setting up the triple carrier NCO with an expected frequency;

reading accumulator values periodically from all six correlators;

searching for signal power in said accumulator values using:

$$I(E_{code}, E_{carrier})^2 + Q(E_{code}, E_{carrier})^2 > \text{THRESHOLD};$$

$$I(P_{code}, P_{carrier})^2 + Q(P_{code}, P_{carrier})^2 > \text{THRESHOLD}; \text{ and}$$

$$I(L_{code}, L_{carrier})^2 + Q(L_{code}, L_{carrier})^2 > \text{THRESHOLD, where}$$

THRESHOLD is an arbitrary power threshold that can be empirically adjusted;

looping back to the step of reading if no power was found; and entering a tracking mode process.

4. The improved receiver of claim 3, wherein said tracking mode process included in the signal acquisition program includes program means in said microcomputer for:

reading accumulator values from all six correlators;

forming tracking loop code and carrier phase estimates from correlator combinations read, symbolized as $\Delta_{carrier\_E}$, $\Delta_{carrier\_P}$, and $\Delta_{carrier\_L}$, for early, punctual and late carrier phases and wherein a code estimate $\Delta_{code}$ is filtered and applied as a correction to the triple code NCO;

using said phase estimates in three independent carrier tracking loops with $\Delta_{carrier\_E}$ filtered and fed back by said microcomputer to said early carrier NCO, filtering $\Delta_{carrier\_P}$ and feeding it back by said microcomputer to said punctual carrier NCO, and filtering said $\Delta_{carrier\_L}$ back by said microcomputer to said late carrier NCO to close three independent carrier tracking loops using three corresponding time-delayed points on an overall autocorrelation function;

reading respective early, punctual and late carrier phase measurements, $C_E$, $C_P$, and $C_L$;

forming a carrier phase estimation function, $F_{est}(C_E, C_P,$ and $C_L)$; and forming a corrected carrier phase measurement, $C_P - F_{est}(C_E, C_P,$ and $C_L)$, which is relatively independent of the effects of multipath interference.

5. A satellite navigation receiver, comprising:

early tracking loop means including an early local carrier NCO, an early carrier mixer and an early code mixer for despreading and tracking a spread-spectrum signal transmitted from an orbiting navigation satellite on an early phase portion of an autocorrelation function derived from correlating said despread and tracked spread-spectrum signal;

punctual tracking loop means including a punctual local carrier NCO, a punctual carrier mixer and a punctual code mixer for despreading and tracking a spread-spectrum signal transmitted from an orbiting navigation satellite on a punctual phase portion of said autocorrelation function; and frequency aiding means connected to receive from the punctual tracking means a numeric value from said punctual local carrier NCO and connected to provide the early local carrier NCO in the early tracking means said numeric value from said punctual local carrier NCO, wherein said early and punctual local carrier NCOs operate at a frequency controlled by the punctual tracking loop means and the phase of said early local carrier NCO is controlled by the early tracking loop means.

6. The receiver of claim 5, further comprising:

late tracking loop means including a late local carrier NCO, a late carrier mixer and a late code mixer for despreading and tracking a spread-spectrum signal transmitted from an orbiting navigation satellite on a late phase portion of said autocorrelation function.

7. The receiver of claim 5, further comprising:

a microcomputer with program means for controlling said early and late local carrier NCOs according an included autocorrelation function.

8. The receiver of claim 7, wherein:

the frequency aiding means is implemented as computer program means in the microcomputer.

9. A method for decreasing the sensitivity of a satellite navigation receiver to the effects of multipath signal interference, comprising the steps of:

generating a primary and a frequency-aided secondary independent local carrier frequencies;

heterodyning said primary and frequency-aided secondary independent local carrier frequencies in a set of primary and frequency-aided secondary independent carrier mixers with a carrier signal received from an orbiting navigation satellite;

despreading with an early, a punctual and a late local code in a set of primary and frequency-aided secondary independent code mixers respectively connected to said set of primary and frequency-aided secondary independent carrier mixers to obtain output samples from the set of inphase early-carrier early-code, inphase punctual-carrier punctual-code, inphase late-carrier late-code, quadrature early-carrier early-code, quadrature punctual-carrier punctual-code, and quadrature late-carrier late-code;

correlating by accumulation of said inphase early-carrier early-code, inphase punctual-carrier punctual-code, inphase late-carrier late-code, quadrature early-carrier early-code, quadrature punctual-carrier punctual-code, and quadrature late-carrier late-code samples; and tracking said orbiting navigation satellite with a primary and a frequency-aided secondary independent carrier tracking loops respectively based on at least two of early, punctual and late autocorrelation function signal power outputs derived by a microcomputer from the step of correlating to control the step of generating.

10. A method for decreasing the sensitivity of a satellite navigation receiver to the effects of multipath signal interference, comprising the steps of:

generating three independent local carrier frequencies;

heterodyning said three independent local carrier frequencies in a set of three independent carrier mixers with a carrier signal received from an orbiting navigation satellite;

despreading with an early, a punctual and a late local code in a set of three independent code mixers respectively connected to said set of three independent carrier mixers to obtain output samples of inphase early-carrier early-code, inphase punctual-carrier punctual-code, inphase late-carrier late-code, quadrature early-carrier early-code, quadrature punctual-carrier punctual-code, and quadrature late-carrier late-code;

correlating by accumulation of said inphase early-carrier early-code, inphase punctual-carrier punctual-code, inphase late-carrier late-code, quadrature early-carrier early-code, quadrature punctual-carrier punctual-code, and quadrature late-carrier late-code samples; and tracking said orbiting navigation satellite with three independent carrier tracking loops respectively based on early, punctual and late autocorrelation function signal power outputs derived by a microcomputer from the step of correlating to control the step of generating.

* * * * *